Dec. 26, 1922.

W. C. STEVENS.
GEAR SHIFTING MECHANISM.
ORIGINAL FILED DEC. 30, 1918.

INVENTOR.
William C. Stevens
BY Frank H Hubbard
ATTORNEY

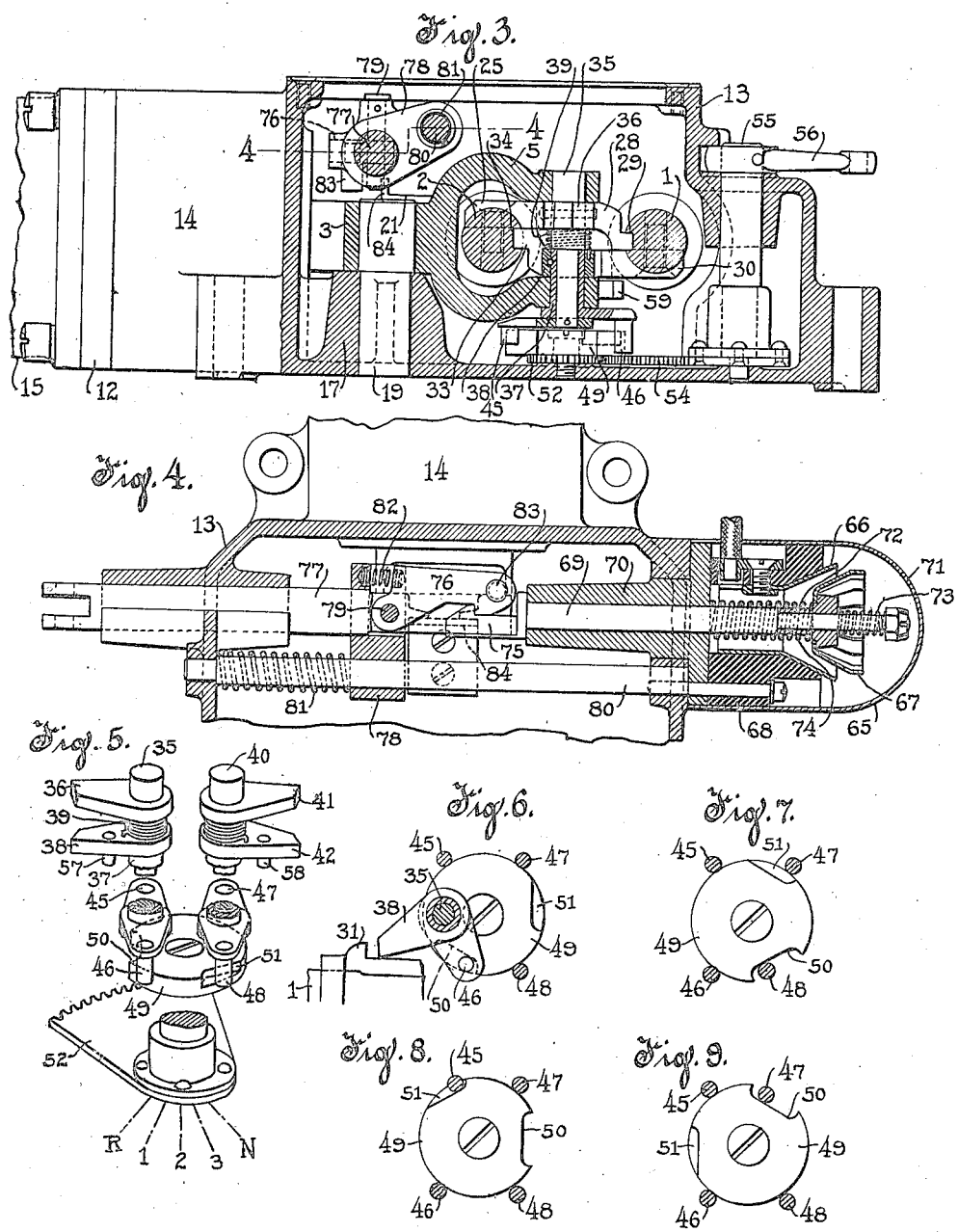

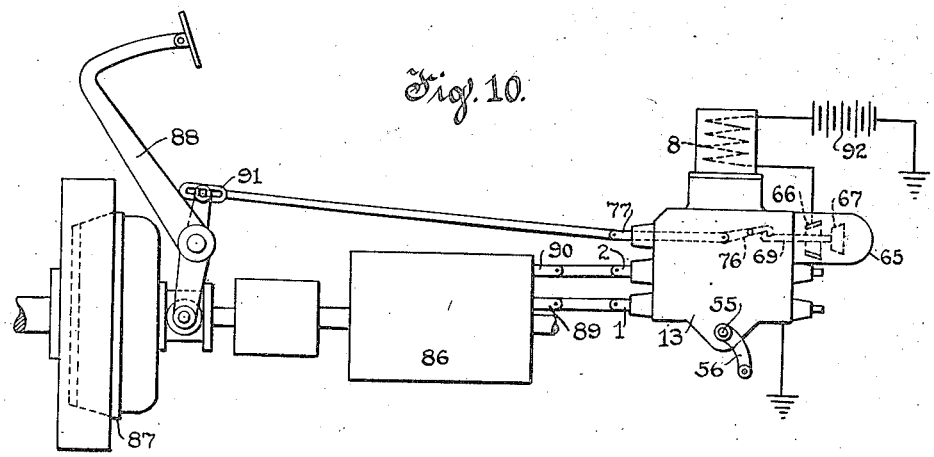
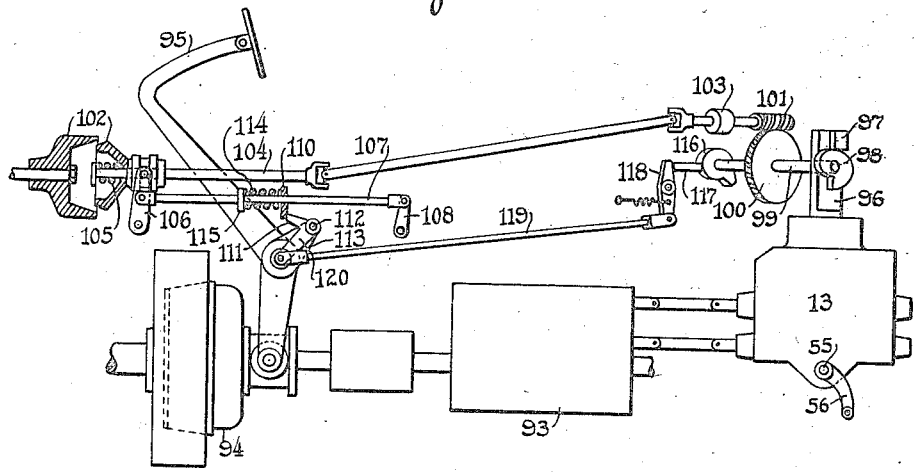

Patented Dec. 26, 1922.

1,439,924

UNITED STATES PATENT OFFICE.

WILLIAM C. STEVENS, OF MILWAUKEE, WISCONSIN, ASSIGNOR, BY MESNE ASSIGNMENTS, TO VULCAN MOTOR DEVICES COMPANY, A CORPORATION OF PENNSYLVANIA.

GEAR-SHIFTING MECHANISM.

Application filed December 30, 1918, Serial No. 269,020. Renewed April 23, 1921. Serial No. 463,906.

*To all whom it may concern:*

Be it known that I, WILLIAM C. STEVENS, a citizen of the United States, residing at Milwaukee, in the county of Milwaukee and State of Wisconsin, have invented new and useful Improvements in Gear - Shifting Mechanisms, of which the following is a full, clear, concise, and exact description, reference being had to the accompanying drawing, forming a part of this specification.

This invention relates to gear shifting mechanisms particularly for automobiles, by means of which gear changes may be effected through operation of the automobile clutch lever or other suitable member following setting of a suitable speed selector.

In practice it is extremely desirable that the gear shifting mechanism of an automobile be of simple, compact, rugged and durable construction and furthermore be capable of rapid operation to minimize clashing of the gears controlled thereby and the present invention has among its objects to provide a shifting mechanism having all of such characteristics.

Another object of the invention is to provide a shifting mechanism requiring but a slight movement of the clutch lever or other control member and a minimum expenditure of manual energy for operation of such lever or other member.

A further object is to provide a preselective shifting mechanism wherein all shifting operations are effected by an energy storing device and wherein means are provided to effect simultaneously energy storing operation of said device and neutralizing operation of the mechanism.

Another object is to provide a shifting mechanism including an energy storing device wherein said device is released to expend its energy free from interference by the operator and without requiring any additional manual operation to effect such release.

Another object is to provide a shifting mechanism utilizing an erergy storing device and a solenoid co-ordinated for maximum efficiency of the latter, said solenoid being energizable at will and de-energizable automatically upon a given operation of said mechanism.

Another object is to provide a shifting mechanism which may be readily adapted to gears requiring various degrees of movement.

Numerous other objects and advantages of the invention will hereinafter appear.

The accompanying drawing illustrates certain embodiments of the invention, and the same will now be described, it being understood that the embodiments illustrated are susceptible of various modifications without departing from the scope of the appended claims.

In the drawing,

Fig. 3 is a sectional view taken on line 3—3, Fig. 1;

Fig. 4 is a sectional view taken on line 4—4, Fig. 3;

Fig. 5 is a perspective view of the speed selector mechanism;

Figs. 6, 7, 8 and 9 are detail views disclosing the coaction of certain parts of the selector mechanism.

Fig. 10 is a schematic view of an automobile transmission utilizing the shifting mechanism shown in Figs. 1 to 9; and, Fig. 11 is a schematic view of an automobile transmission utilizing the aforesaid mechanism without the solenoid, power to be furnished by the automobile engine or other suitable power device.

Figure 1:
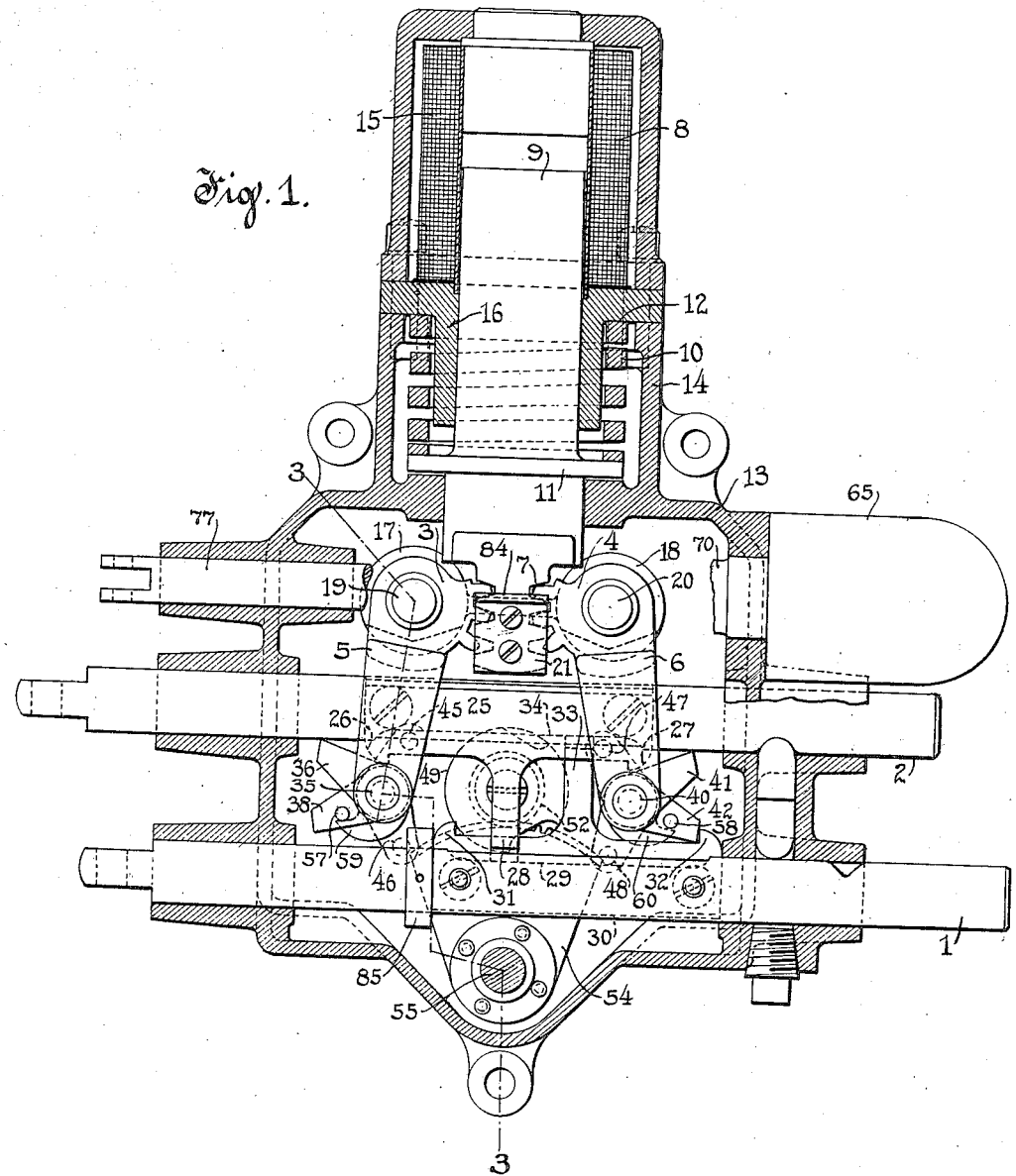
Figure 1 is a sectional view of a solenoid operated mechanism, the parts being positioned for a given gear setting.
Figure 2:
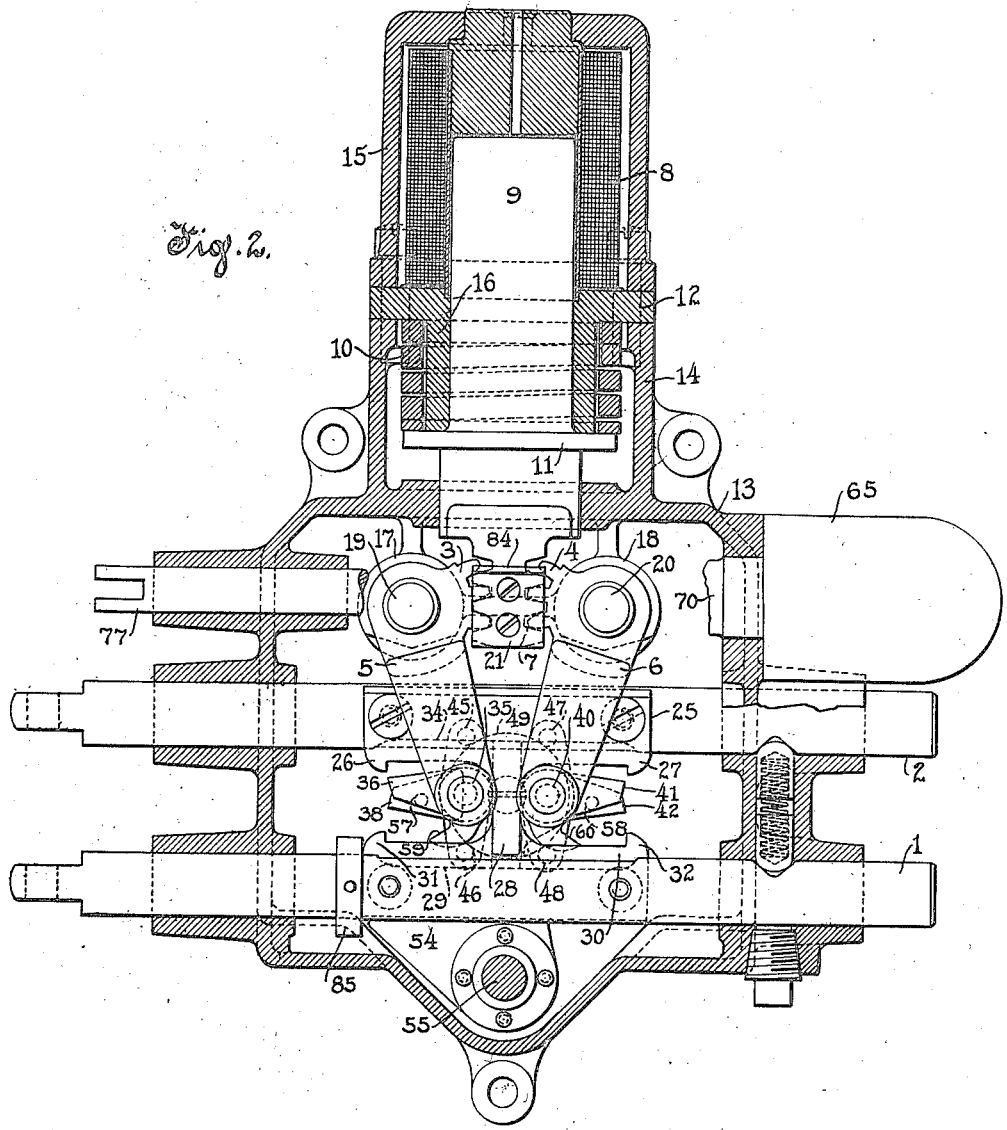
Fig. 2 is a similar view showing the mechanism neutralized but prior to final operation of certain parts.

Referring to Figs. 1 and 2, the mechanism shown therein includes reciprocable shift rods 1 and 2, gear sectors 3 and 4 respectively provided with arms 5 and 6 to actuate said rods through media hereinafter described, a reciprocable rack 7 in mesh with said gear sectors and operable to oscillate the latter for movement of said arms toward and away from one another, a solenoid 8 having a reciprocable plunger 9 to which said rack is fixed and a helical spring 10 confined between a flange 11 on said plunger and a fixed part 12. The co-ordination of elements is such that the solenoid moves the rack in a direction to force the arms 5 and 6 towards one another to set the rods in a neutral relation as shown in Fig. 2, while the spring 10, which is compressed by the solenoid in so operating the rack, moves said rack in a direction to spread said arms as shown in Fig. 1 for movement of one or the other of the rods either to the right or to the left, means being provided, as hereinafter set forth, to insure operation of said rods singly and in a selected direction. Also, the aforesaid elements are so proportioned and co-ordinated that a given movement of the solenoid plunger, either under the influence of its winding or the spring, effects a relatively greater movement of the shift rod to which its motion is transmitted.

The mechainsm illustrated is particularly designed for a three speed and reverse automobile transmission gear, the rods 1 and 2 being provided for suitable connection to the shifting forks of such transmission gear whereby the same, together with the arms and rack, provide a shifting and neutralizing medium, subject to neutralizing operation by the solenoid and to shifting operation by the energy stored in the spring. Thus since it is well understood that the maximum amount of available energy is desired for effecting the shifting operations, and moreover is desired at the start of such operations, the amount of energy required for neutralization being relatively small, the advantages of the mechanism described will be at once apparent. Neutralizing operations being effected by the solenoid, all energy stored in the spring is utilizable for shifting operations and said spring being compressed as described, the full amount of energy stored therein is available for initiation of the shifting operations. Also, since the connections between the rods and the plunger actuated by the spring provide for an augmented motion of said rods, the mechanism illustrated provides for rapid movement of said rods to minimize clashing of the gears. Furthermore since it is well known that the pull of a solenoid varies inversely as its air gap, it will also be apparent that the mechanism described has numerous advantages as regards the use of a solenoid. With the elements co-ordinated as described the spring offers a minimum resistance upon initiation of the stroke of the plunger and as before stated, the force required for neutralizing operations is relatively small so that the solenoid which has no other work to perform initially responds with but a relatively small load on its plunger. Then as the plunger is drawn into the winding, the load imposed thereon by the gears gradually drops off while the magnetic pull increases, thereby enabling the solenoid to compress the spring for storage of energy therein without diversion of its power to other parts of the apparatus.

Moreover as above set forth the connections between the rods and the solenoid plunger provide for reduction of the movement of the solenoid plunger required for imparting the desired movement to the shift rods. Accordingly the solenoid requires but a relatively short stroke and may therefore be designed for a high degree of efficiency. In practice the solenoid is preferably designed to exert a pull in excess of that required for the aforesaid neutralizing operations of the rod and energy storing operation of the spring whereby with the co-ordination of elements described a stronger spring might be substituted for that shown to provide a greater supply of energy for shifting operations without necessitating any alterations in the mechanism.

The shift rods which are interchangeable are reciprocably mounted in a rectangular casing 13 having a cylindrical extension 14 to receive the spring 10 and the plunger of the solenoid, said solenoid having a magnetic casing 15 secured by bolts to the end of said casing part 14 through the aforesaid fixed member 12 which has a sleeve portion 16 within which the solenoid plunger reciprocates and about which the spring 10 is coiled. Also, the casing is provided interiorly thereof with bosses 17 and 18 in which are secured studs 19 and 20 for pivotally supporting the gear sectors which are held thereon by a plate 21 screwed to the rack 7 and which as will appear are of like construction and hence also interchangeable. As shown in Fig. 3 the gear sectors are arranged to lie in a plane substantially the same as that of the shift rods 1 and 2 and the arms 5 and 6 of said sectors are forked to straddle the rod 2 for supporting between said rods means to engage lugs thereon, now to be described.

The shift rod 2, as best illustrated in Figs. 1 and 2 has fixed thereto a plate 25 having at opposite ends lugs 26 and 27 and an intermediate lug 28, which, as best illustrated in Fig. 3, has its extremity offset to project into a longitudinally extending groove 29 in rod 1. Rod 1 also has fixed thereto a similar plate 30 provided with end lugs 31 and 32 and an intermediate lug 33, the latter having its extremity offset and projecting into a longitudinally extending groove 34 in rod 2. These plates which are interchangeable thus interlock the rods against relative rotation and the intermediate lugs thereof are disposed in the path of parts carried by arms 5 and 6 whereby said rods are insured movement into the relation shown in Fig. 2, when said arms are moved towards one another while the end lugs of said plates afford shoulders engageable by parts carried by said arms for movement of the rods to extreme positions as exemplified in Fig. 1 when said arms are separated. More specifically referring to Fig. 3, the arm 5 is provided with a pin 35 supported by the forked extremities thereof to lie between the shift rods, said pin having fixed thereto adjacent to its upper end, a dog 36 (also shown in Figs 1 and 2) aligned with plate 25 on shift rod 2. Also, pin 35 is provided with a portion of reduced diameter carrying a sleeve 37 having fixed thereto a dog 38 (also shown in Figs. 1 and 2) aligned with plate 30 on shift rod 1, said dogs being biased towards their respective shift rods by a helical spring 39 surrounding the pin 35 and having its opposite ends respectively connected to said dogs. The pin 35 is arranged to one side of the intermediate lugs of both plates 25 and 30 and the arm 6 carries a pin 40 (Figs. 1 and 2) arranged to the other side of said lugs and carrying dogs 41 and 42 identical with the dogs 36 and 38 and supported in precisely the same manner. The dog 41 is aligned with plate 25 on rod 2 while the dog 42 is aligned with the plate 30 on rod 1 and said dogs are biased towards their respective rods, as in the case of dogs 36 and 38. Accordingly the hubs of said dogs co-operate with the intermediate lugs on the plates 25 and 30 to move the rods 1 and 2 to the relation shown in Fig. 2 when the arms 5 and 6 are forced together while the dogs 36, 38, 41 and 42 serve when selectively engaged with the lugs 26, 31, 27 and 32 on the shift rods to selectively move the latter either to the right or left as exemplified in Fig. 1 when the arms 5 and 6 are forced apart.

Such selective control of the dogs 36, 38, 41 and 42 is afforded by providing the pins and sleeves carrying said dogs with crank pins 45, 46, 47 and 48 (Figs. 1, 2 and 5) to ride upon the periphery of a disk 49 rotatably mounted on the bottom wall of casing 13, as best illustrated in Fig. 3, said figure also showing in detail the connections of crank pins 45 and 46 with dogs 36 and 38 respectively which connections are typical of those between the remaining crank pins and their respective dogs. The disk is of such diameter that when all of the pins ride on the periphery thereof, as shown in Figs. 2 and 5, the dogs are all withdrawn from engagement with the shift rods and under such conditions spreading of the arms 5 and 6 would not affect operation of either shift rod. The disk, however, is as best illustrated in Figs. 5 to 9, provided with a notch 50 to receive any one of the pins 46, 48 and 47, thus permitting the dogs connected to said pins to rock under the influence of their springs into the path of their respective lugs on their respective shift rods, as exemplified in Fig. 6. As shown in Fig. 6, the disk is in an angular position to receive the pin 46 in notch 50 thus allowing the dog 38 to engage the lug 31 on shift rod 1, while Fig. 7 shows the disk rotated to an angular position to receive pin 48 in the notch 50 thereby allowing dog 42 to engage lug 32 on shift rod 1 and Fig. 9 shows the disk in an angular position to receive pin 47 in the notch thereby allowing dog 41 to engage lug 27 on rod 2. In all of said positions of the disk the same holds three of the dogs out of engagement with the shift rods whereby separative movement of the arms provides for movement of the rod 1 either to the right or to the left, or else movement of rod 2 to the right according to the setting of the disk. The pin 45 is made shorter than the remaiing pins and the disk is provided with a second notch 51 of a depth sufficient to receive the pin 45 but insufficient to receive any of the remaining pins and said notch 51 is positioned to register with the pin 41 as the disk is rotated from the position shown in Fig. 7 to the position shown in Fig. 8, which position is between those shown in Figs. 7 and 9. Thus assuming use of the dogs 47, 46, 48 and 45 in respectively effecting shifts for reverse, first, second and third speeds, the aforesaid arrangement enables progressive selection of the forward speed selector dogs without passing the disk through reverse position and also enables uni-directional rotation of the disk from reverse position through third, second and first speed positions in the order named to the neutral position shown in Fig. 5. Further, the arrangement enables the movement of the disk to be confined to a range of less than 270 degrees and to be equally divided between the five positions thereof above enumerated. The disk is operable through a pinion 52 by a gear sector 54 fixed to a shaft 55 having an operating lever 56 external of the casing and adapted for connection to and operation by a selector lever mounted on the steering column or in some other convenient position.

As exemplified in Fig. 1, when the mechanism has been subjected to a shifting operation the dogs are moved bodily away from the disk, whereby said disk may be freely operated to select another future shift, or for neutralization of said disk without at the time of its operation influencing any of the dogs. Then assuming neutralizing movement of the arms the crank pins of all of the dogs are forced against the selector disk, as shown in Fig. 2, with the result of disengaging all of said dogs from the rods if the disk is set in neutral position, as illustrated. On the other hand, assuming previous setting of the disk in a speed selecting position, the crank pin of one of the dogs would enter one of the notches in the disk and under the influence of its spring snap into engagement with its respective shift rod, thus preparing the mechanism for the desired operation immediately upon release of the energy stored in the spring. Moreover, since the dogs are as above stated, moved away from the selector disk the active dog is insured continued engagement with its respective shift rod thereby maintaining the connection between such rod and the spring to utilize the latter for holding the controlled gears in shifted position. The idle dogs pass the lugs on their respective shift rods upon initiation of each shifting operation and are thus insured against interference with the desired shifting operation. In the structure illustrated the dogs 38 and 42, which co-operate with the rod 1, are respectively provided with pins 57 and 58 to abut stops 59 and 60 respectively provided on the extremities of arms 5 and 6 whereby said dogs when not in use are held out of contact with said rod. This provision is desirable to insure against stubbing of the lugs on the rod and similar provisions might be made for the remaining dogs, if desired, but as shown, the dogs 36 and 41 are prevented from stubbing on rod 2 by the lugs 26 and 27 on plate 25.

A switch 65 is provided for energizing and deenergizing the solenoid and as best illustrated in Fig. 4, said switch comprises a funnel-shaped stationary contact 66 and a mushroom-shaped co-operating contact 67, the former being mounted on an insulating base 68 and the latter upon the reduced end of a rod 69. The rod 69 is supported in a flanged bushing 70 projecting through a wall of the casing 13 and said bushing and insulating base are suitably fixed to said casing, all external parts being enclosed in a casing 71. The contact 67 is provided with a bushing 72 slidingly fitting the reduced portion of rod 69 which carries a coil spring 73 biasing the contact against the end of the enlarged portion of the rod, the latter also carrying a coil spring 74 interposed between the contact and the fixed bushing 70 to bias said contact out of engagement with contact 66. On the other hand, the contact 67 is movable into engagement with contact 66 through the medium of the rod 69 and spring 73 which preponderates spring 74, said rod having a hooked extremity 75 to be engaged by a latch 76 connected to an operating rod 77 reciprocably mounted in an opposite wall of the casing 13 and adapted to be connected to the clutch lever of the automobile or to other suitable operating means. The operating rod 77 has mounted thereon a block 78 slotted at its upper end to receive the latch 76 which is pivotally mounted upon a pin 79 passing through the operating rod and also through said block thereby securing said block in a fixed position on said rod. The block 78 has a sliding fit with a rod 80 fixedly supported within the casing 13 and carrying a coil spring 81 interposed between said block and a wall of said casing to bias the rod 77 towards the rod 69 for automatic engagement of the latch 76 with the hook 75. The latch is biased for engagement with the hook by spring 82 interposed between said latch and said block above the pivot of the former and said latch is provided at its forward end with a tripping pin 83. The arrangement of parts is such that the switch is operated by movement of the latch in a direction at right angles to the direction of movement of the rack member and is moreover such that when the pin 83 is drawn into alignment with the rack and the latter is raised, a lip 84 on plate 21 strikes said pin, thereby disengaging the latch from the hook and releasing the switch for opening thereof by the spring 74.

Thus the switch provides for energization of the solenoid at will and response of said solenoid provides for automatic tripping of said switch whereby the spring 10 is enabled to expend the energy stored therein for effecting shifting operations free from possibility of interference by the operator. In other words, the arrangement precludes possibility of the operator defeating the desired rapid operation of the parts for gear shifting and moreover the movement of the tripped and tripping parts at right angles to one another insures release of the switch at the proper time without dependency upon the skill of the operator. Regardless of variations in the degree of movement of the switch operating member, the trip described provides for release of the switch immediately upon completion of the neutralizing operation of the shifting medium and energy storing operation of the spring but precludes premature release of said switch.

In practice it is sometimes necessary to provide for different degrees of movement of the shifting rods for different shifts of the same transmission gear and also to suit the mechanism to the requirements of different types of transmission gears and the mechanism illustrated is particularly advantageous in such respects. The arrangement is such that while the operating means provides for given and like movements of both shift rods in opposite directions from neutral position, it is also such as to enable curtailment of the movement of any or all of the rods without interference with the action of the operating means, or with the operation of the switch 65. Moreover, where curtailment of the movement of any rod is desired, such curtailment may be accomplished by means such as the collar 85 provided on the rod 1 (Figs. 1 and 2) which abuts the casing wall to curtail the movement of said rod to the left by an amount equal to the thickness of said collar. The collar in nowise limits the return movement of the rod and hence the solenoid is free to attract its plunger to the same limit as if said collar were omitted, thus providing for compression of the spring and tripping of the switch precisely as above described.

Referring to Fig. 10, the same shows schematically an automobile transmission including a gear box 86, a clutch 87 and a lever 88 for disengaging said clutch. Also this view shows diagrammatically the above described shifting mechanism (designated as 13) having its rods 1 and 2 respectively connected to the fork carrying rods 89 and 90 of the transmission gear and having its switch actuating rod 77 connected through a slotted link 91 to a lug on the clutch lever 88. The arrangement is such that movement of the clutch lever 88 in a direction to disengage the clutch actuates the rod 77 to close the switch 65 of the shifting mechanism for energization of the solenoid 8 and operation of the shifting mechanism for the desired gear change, as above described. However, the slotted link 91 provides a lost motion connection between lever 88 and the switch to permit clutch disengaging operation of the former without actuation of said switch. The solenoid is shown as supplied with current from a battery 92 having one terminal thereof grounded and its other terminal connected through the solenoid winding to contact 66 of the switch 65. The contact 67 of said switch is grounded through the casing 13 of the shifting mechanism.

Fig. 11 shows diagrammatically a slightly modified form of shifting mechanism designated as 13, associated with an automobile tranmission including a gear box 93, a clutch 94 and a clutch lever 95. In this instance the shifting mechanism is modified for operation by the automobile engine or other power device, the solenoid being replaced by a mechanically operated reciprocable bar 96 functioning with respect to the spring 10 in precisely the same manner as the solenoid. The bar 96 has a part 97 bearing upon a cam 98 fixed to a shaft 99, said cam being of a form to lift and then trip the bar 96 for free actuation of the latter by spring 10, when the shaft 99 is rotated. Shaft 99 has fixed thereto a worm wheel 100 to be driven by a worm 101 which is connected to the releasable member of a clutch 102 serving to connect said worm to a rotating part of the automobile engine or other preferred power device, the connections between the clutch and worm including a one-way clutch 103 to insure unidirectional rotation of the worm. Further, such connections include a shaft 104 upon which the releasable member of the clutch is keyed, said clutch member being slidable longitudinally of said shaft and being biased by spring 105 in a direction to disengage its co-operating clutch member. The clutch 102 is thus normally disengaged and is engageable by a lever 106 having connected thereto a rod 107 supported at its free end by a link 108. This rod has slidably mounted thereon a collar 110 to be engaged by a pawl 111 pivoted at 112 to a lug 113 on lever 95, said collar 110 bearing against a compression spring 114 surrounding rod 107 and having a stop collar 115 fixed to said rod. The arrangement is such that movement of the lever 95 in a direction to disengage clutch 94 acts through pawl 111 and collar 110 to compress spring 114 for providing a force to preponderate that of spring 105 and thereby engage clutch 102. Thus assuming engine drive of the clutch 102, clutch disengaging operation of lever 95 effects drive of shaft 99 to raise and trip bar 96 of the shifting mechanism thereby providing for shifting or neutralizing operation of said mechanism in precisely the same manner as above described, it being understood that engagement of clutch 102 would be made dependent upon a movement of the lever 95 exceeding that required for disengaging of the clutch 94 whereby the latter might be operated without effecting operation of the shifting mechanism. Also, it will be understood that with the arrangement described it would be necessary to limit the cam 98 to a single revolution for each engagement of the clutch 102 to prevent repeated action of the shifting mechanism should the clutch lever 95 be held depressed. To this end shaft 99 is provided with a second cam 116 bearing against a member 117 connected through a double ended lever 118 and link 119 to a lug 120 on pawl 111, said connections under the pressure or cam 116 acting to disengage the pawl from the disk thereby allowing clutch 102 to disengage. Further the connection between the link 119 and the pawl is made concentric with the axis of the lever 95 whereby the pawl 111 is actuated to release the clutch 102 at a given time regardless of slight variations in the throw of the clutch lever, thus tending to always insure arrest of the cam 98 in a given rotary position for uniformity of successive operations thereof.

What I claim as new and desire to secure by Letters Patent is:

1. In a gear shifting mechanism, the combination with a shifting and neutralizing medium, of an energy storing device to furnish power for the shifting operations thereof and means controllable by the operator to subject said device to energy storing operation and also to simultaneously subject said medium to neutralizing operation, said combination including means to thereafter automatically release said device to expend the energy stored therein free from interference by the operator.

2. In a gear shifting mechanism, the combination with a shifting and neutralizing medium, of an energy storing device to furnish power for the shifting operations thereof and means to subject said device to energy storing operation and also to simultaneously subject said medium to neutralizing operation, said means including a manually operable member to direct the shifting operation at will and said combination including means to release said device for expending the energy stored therein free from interference by said member.

3. In a gear shifting mechanism, the combination with a shifting and neutralizing medium, of an energy storing device to furnish power for effecting shifting operations thereof, a member operable at will to direct shifting operations, means subjecting said device and said medium to energy storing and neutralizing operations respectively in response to a given movement of said member, and means to free said medium and said device for operation of the former by the latter during retention of said member.

4. In a gear shifting mechanism, the combination with a shifting and neutralizing medium, of an energy storing device to furnish power for effecting shifting operations thereof, a member operable at will and means for subjecting said device to energy storing operation and also subjecting said medium to neutralizing operation and then to shifting operation by said device in response to a unidirectional movement of said member.

5. In a gear shifting mechanism, the combination with a preselective shifting and neutralizing medium, of an energy storing device to furnish power for effecting shifting operations of said medium and power operated means functioning solely to simultaneously effect neutralizing operation of said medium and storage of energy in said device.

6. In a gear shifting mechanism, the combination with a shifting and neutralizing medium, of an energy storing device to furnish power for effecting shifting operations thereof, power operated means to effect neutralizing operation of said medium and storage of energy in said device and means controlling the former means to provide for release of the energy stored in said device for operation of said medium but only after neutralization of the latter.

7. In a gear shifting mechanism, the combination with a shifting and neutralizing medium, of an energy storing device to furnish power for effecting shifting operations thereof, power actuated means to effect neutralizing operation of said medium and storage of energy in said device and means operable by certain of said parts to automatically effect release of the energy stored in said device for operation of said medium but only after prior neutralization of the latter.

8. In a gear shifting mechanism, the combination, with a shifting and neutralizing medium, of power responsive means to effect neutralizing operation of said medium, a device in which energy is stored by operation of said means, said device expending the energy stored therein for shifting operation of said medium when the power supplied to said means is terminated and means operated by certain of the aforesaid elements to terminate the power supplied to said means following neutralizing operation of said medium.

9. In a gear shifting mechanism, the combination with a preselective shifting and neutralizing medium, of an energy storing device to furnish power for effecting shifting operations of said medium and electromagnetic means functioning solely to simultaneously effect neutralizing operation of said medium and storage of energy in said device.

10. In a gear shifting mechanism, the combination with a shifting and neutralizing medium, of an energy storing device to furnish power for effecting shifting operations of said medium, electromagnetic means for simultaneously effecting neutralizing operation of said medium and energy storing operation of said device and means operable by certain of the aforesaid elements to de-energize said electromagnetic means after neutralization of said medium to cause said device to expend the energy stored therein.

11. In a gear shifting mechanism, the combination with a preselective shifting and neutralizing medium, of a solenoid for subjecting said medium to neutralizing operation and a device operable by said solenoid to store up energy for effecting shifting operations of said medium, said solenoid being free from other work.

12. In a gear shifting mechanism, the combination with a shifting and neutralizing medium, of an energy storing device to furnish power for effecting shifting operations of said medium, a solenoid having its plunger connected to said medium, said solenoid upon responding effecting neutralizing operation of said medium and energy storing operation of said device and means actuated by certain of said parts to de-energize said solenoid for immediate operation of said medium by said device.

13. In a gear shifting mechanism, the combination with a shifting and neutralizing medium, of an energy storing device and a solenoid connected to said medium to respectively effect shifting and neutralizing operations thereof, said solenoid also being operatively connected to said device to effect energy storing operation thereof and means operable by certain of said parts to de-energize said solenoid at a given time following neutralizing operation of said medium.

14. In a gear shifting mechanism, the combination with a shifting and neutralizing medium of an energy storing device and a power operated device operatively connected to said medium to respectively effect shifting and neutralizing operations thereof, said power operated device also effecting energy storing operation of the former device and means for rendering said power operated device effective at will and thereafter automatically rendering the same ineffective upon completion of the neutralizing operation of said medium and a given energy storing operation of the first mentioned device.

15. In a gear shifting mechanism, the combination with a shifting and neutralizing medium, of an energy storing device and an electro-responsive device operatively connected to said medium to respectively effect shifting and neutralizing operations thereof, said electro-responsive device also effecting energy storing operation of the former device, a switch operable at will to energize said electro-responsive device and tripping means for said switch operable by one of the aforesaid parts upon completion of the neutralizing operation of said medium and a given energy storing operation of the first mentioned device.

16. In a preselective gear shifting mechanism, the combination with a shifting and neutralizing medium, of an energy storing device to furnish power for the shifting operations thereof, said medium being controllable to utilize the power supplied by said device to effect different preselected shifting operations thereof, means to subject said medium to neutralizing operation and to effect energy storing operation of said device, and automatic control means for the former means.

17. In a preselective gear shifting mechanism, the combination with a shifting and neutralizing medium, of a power operated device for subjecting said medium to neutralizing operation and a device operable by the former device to store up energy for effecting shifting operations of said medium said power operated device being free from other work and said medium being controllable to utilize the energy stored in said second mentioned device for different preselected shifting operations thereof.

18. In a gear shifting mechanism, the combination with a shifting and neutralizing medium, of an energy storing device to supply power for shifting operations thereof, said medium being controllable to utilize the power of said device for different shifting operations, means for effecting neutralizing operation of said medium and energy storing operation of said device and controlling means for said medium whereby the shifting operations of the same may be determined in advance of the neutralizing operations thereof.

19. In a preselective gear shifting mechanism, the combination with a shifting and neutralizing medium, of a solenoid for subjecting the same to neutralizing operation and a device operable by said solenoid to store up energy for effecting shifting operations of said medium, said solenoid being free from other work, said medium being controllable to utilize the energy stored in said device for different preselected shifting operations.

20. In a gear shifting mechanism, the combination with a shifting and neutralizing medium, of a solenoid for subjecting the same to neutralizing operation, a device operable by said solenoid to store up energy for effecting shifting operations of said medium, said medium being controllable to utilize the stored energy of said device for different shifting operations thereof and controlling means for said medium whereby the shifting operations of the same may be selected prior to the neutralizing operations incident to the accomplishment thereof.

21. In a gear shifting mechanism for automobiles, the combination with a shifting and neutralizing medium, of an energy storing device to furnish power for the shifting operations thereof and means to simultaneously subject said device to energy storing operation and said medium to neutralizing operation at will, said means including an element for controlling the automobile clutch to insure disengagement of the latter during shifting operations and said combination including means insuring release of said device for expending the energy stored therein immediately upon completion of the neutralizing and energy storing operations.

22. In a gear shifting mechanism for automobiles, the combination with a shifting and neutralizing medium, of an energy storing device to furnish power for the shifting operations thereof, and means including the automobile clutch lever to simultaneously subject said device to energy storing operation and said medium to neutralizing operation, said combination including means providing for operation of said medium by said device free from restraint by said lever.

23. In a gear shifting mechanism for automobiles, the combination with a shifting and neutralizing medium, of an energy storing device to furnish power for effecting shifting operations thereof, means including the automobile clutch lever for subjecting said device and said medium to energy storing and neutralizing operations respectively and for thereafter releasing said device to expend the energy stored therein, all upon operation of said lever in a direction to disengage the clutch.

24. In a gear shifting mechanism for automobiles, the combination with a shifting and neutralizing medium, of an energy storing device to furnish power for effecting shifting operations thereof, power operated means to simultaneously effect neutralizing operation of said medium and storage of energy in said device, means including the automobile clutch lever for rendering said power operated device effective at will and means providing for operation of said medium by said device free from restraint by said former means.

25. In a gear shifting mechanism for automobiles, the combination with a shifting and neutralizing medium, of an energy storing device to furnish power for effecting shifting operations thereof, electromagnetic means to simultaneously effect neutralizing operation of said medium and storage of energy in said device, and control means including the automobile clutch lever, a switch biased to open position and operable by said lever to energize said electromagnetic means and an automatically operated device to effect release of said switch from said lever for de-energization of said means.

26. In a gear shifting mechanism for automobiles, the combination with a shifting and neutralizing medium, of an energy storing device, electromagnetic means to effect neutralizing operation of said medium and also to effect storage of energy in said device for shifting operation of said medium upon subsequent de-energization of said electromagnetic means, a control switch for said electromagnetic means biased to open position, an operating member for said switch having a releasable connection therewith and a tripping element for said connection operable by said electromagnetic means in a direction substantially perpendicular to the direction of travel of the part of said connection to be engaged thereby.

27. In a gear shifting mechanism, the combination with a shifting and neutralizing medium, of an energy storing device and a solenoid connected to said medium to respectively effect shifting and neutralizing operations thereof, said solenoid also being operatively connected to said device to effect energy storing operation thereof and controlling means for said solenoid including a switch biased to open position, a member having a releasable connection with said switch for closing the same at will and an automatically operated device for tripping said switch free of said member whereby said member must be returned to a given position prior to subsequent energization of said solenoid.

28. In a gear shifting mechanism, the combination with a shifting and neutralizing medium, of an energy storing device and a solenoid connected to said medium to respectively effect shifting and neutralizing operations thereof, said solenoid also being operatively connected to said device to effect energy storing operation thereof and control means for said solenoid including the automobile clutch lever, a switch biased to open position and connected to said lever for closure thereby and an automatically operated device for tripping said switch free of said lever for de-energization of said solenoid whereby said lever must be returned to a given position prior to subsequent energization of said solenoid.

29. In a gear shifting mechanism, the combination with a shifting rod, of an energy storing device to effect gear shifting operations thereof, and a solenoid to effect neutralizing operation of said rod and energy storing operation of said device, said solenoid having a connection with said rod whereby a given stroke of the former effects a relatively greater movement of the latter.

30. In a gear shifting mechanism, the combination with a rod, of an energy storing device to effect gear shifting operations of said rod, said device having a connection with said rod for accelerating the speed of movement of the latter and means for simultaneously effecting neutralizing operation of said rod and storage of energy in said device.

31. In a gear shifting mechanism, the combination with a shift rod, of an energy storing device, a solenoid and connections subjecting said rod to neutralizing operation and said device to energy storing operation by said solenoid and further subjecting said rod to gear shifting operations by said device, said connections including means for augmenting the motion transmitted to said rod both by said device and said solenoid.

32. In a gear shifting mechanism, the combination with a shift rod, of oppositely movable members engageable therewith and operable to move the same in opposite directions from an intermediate position and to return said rod to such intermediate position, an energy storing device for effecting a certain relative movement of said members and means normally connected to a part of said device and operable for effecting a reverse relative movement of said members and simultaneously effecting energy storing operation of said device.

33. In a gear shifting mechanism, the combination with a shift rod, of oppositely movable members engageable therewith and operable to move the same in opposite directions from an intermediate position and to return said rod to such intermediate position, an energy storing device for effecting a certain relative movement of said members and a solenoid having its plunger fixed to a part of said device, said solenoid being energizable for effecting a reverse relative movement of said members and simultaneously effecting energy storing operation of said device.

34. In combination, a shift rod, a pair of gear sectors having parts to engage said rod and being operable to move said rod in opposite directions selectively from an intermediate position and to return said rod to such intermediate position, a rack co-operating with both of said gear sectors to move parts thereof toward and away from one another according to the direction of its own movement, an energy storing device to move said rack in one direction and means to move said rack in a reverse direction and at the same time to effect energy storing operation of said device.

35. In combination, a shift rod, a pair of gear sectors having arms to coact with said rod and being operable to move said rod in opposite directions selectively from an intermediate position and to return the same to such intermediate position, a rack co-operating with both of said gear sectors to move the arms thereof toward and away from one another according to the direction of its own motion, an energy storing device for moving said rack in one direction and a solenoid for moving said rack in a reverse direction and at the same time effecting energy storing operation of said device.

36. In combination, a shift rod, a pair of gear sectors having arms to coact with said rod and being operable to move said rod in opposite directions selectively from an intermediate position and to return the same to such intermediate position, a reciprocable rack co-operating with said sectors to move said arms thereof toward and away from one another, a solenoid having its plunger operatively connected to said rack to move the latter in one direction and a helical spring surrounding the plunger of said solenoid to be compressed thereby for storage of energy to move said rack in a reverse direction.

37. In a gear shifting mechanism, the combination with a preselective shifting and neutralizing medium, of an energy storing device to effect shifting operations thereof and means operable to simultaneously effect neutralizing operation of said medium and energy storing operation of said device, said energy storing device functioning through said medium to retain the gears in shifted position pending subsequent neutralizing operation of said medium.

38. In a gear shifting mechanism, the combination with a shift rod, of an energy storing device to effect shifting operations thereof, preselective commutatable operative connections between said device and said rod to provide for different shifting operations of the latter by the former, said connections rendering said device effective to yieldingly hold said rod against return movement following any of such shifting operations and means to effect neutralizing operation of said rod against the bias of said energy storing device to thereby effect storage of energy in the latter.

39. In a gear shifting mechanism, the combination with a shift rod, of an energy storing device to move the same from a neutral position to an operative position, means to return said rod from such operative position to said neutral position and at the same time effect storage of energy in said device, said device and means providing for a given degree of movement of said rod and means for curtailing the movement of said rod.

40. In a gear shifting mechanism, the combination with a shift rod, of an energy storing device to move the same away from a neutral position, means to return said rod to neutral position and to effect energy storing operation of said device, said device and means providing for operation of said rod through a given range, means for limiting the operation of said rod to a lesser range and means to effect release of said device for expenditure of the energy stored therein whenever said rod is restored to neutral position, said last mentioned means being unaffected by variations in the range of movement of said rod.

41. In a gear shifting mechanism, the combination with a shift rod, of an energy storing device to move the same away from a neutral position, means to return said rod to neutral position and to effect energy storing operation of said device, said device and means providing for operation of said rod through a given range, means for limiting the operation of said rod to a lesser range and means to effect release of said device for expenditure of the energy stored therein whenever said rod is restored to neutral position, said last mentioned means being operable by said first mentioned means to function irrespective of variations in the range of movement of said rod.

42. In a gear shifting mechansim, the combination with a shift rod, of an energy storing device to supply power for gear shifting operations thereof, of commutatable connections between said device and said rod to utilize the power of the former for effecting different shifting operations of the latter and means to effect neutralizing operation of said rod and energy storing operation of said device, said connections being selectable at any time and being commutatable in accordance with such selection during neutralizing operation of said medium.

43. In a gear shifting mechanism, the combination with a shift rod, of an energy storing device to supply power for gear shifting operations thereof, connections between said device and said rod, commutatable to utilize the power of the former for effecting different shifting operations of the latter, means for effecting neutralizing operation of said rod and energy storing operation of said device and commutating means for said connections whereby any connection may be pre-selected and whereby the pre-selected connection is established during neutralizing operation of said rod.

44. In a gear shifting mechanism, the combination with a shift rod, of an energy storing device to supply power for the shifting operations of said rod, operative connections between said device and said rod including dogs to be selectively engaged with the latter to utilize the power of said device for effecting different shifting operations, means operable to effect neutralizing operations of said rod and at the same time effect energy storing operation of said device and selecting means for said dogs providing for setting of the latter during neutralizing operation of said rod.

45. In a gear shifting mechanism, the combination with a shift rod and energy storing device to supply power for operating said rod, operative connections between said device and said rod including a plurality of dogs biased to engage said rod and selectively disengageable therefrom to utilize the power of said device for effecting different operations of said rod, said dogs when disengaged from said rod being releasable to re-engage the same during subsequent neutralizing operation thereof and means to effect neutralizing operation of said rod and at the same time effect energy storing operation of said device.

46. In a gear shifting mechanism, the combination with shift rods, of oppositely movable members engageable with said rods to neutralize the same and carrying dogs biased to engage said rods for movement of the latter away from neutral position upon a given relative movement of said members, an energy storing device to supply power for the latter operation of said members, means for imparting neutralizing movement to said members and at the same time effecting storage of energy in said device and means for selectively disengaging said dogs from said rods.

47. In a gear shifting mechanism, the combination with shift rods, of oppositely movable members engageable with said rods to neutralize the same and carrying dogs biased to engage said rods for movement of the latter away from neutral position upon a given relative movement of said members, an energy storing device to supply power for the latter operation of said members, means for imparting neutralizing movement to said members and at the same time effecting storage of energy in said device and means for selectively disengaging said dogs from said rods, said means being adapted to be set at any time and to function during the next neutralizing operation.

48. In a gear shifting mechanism, the combination with shift rods, of shifting and neutralizing means therefor including oppositely movable members adapted when moved toward one another to effect neutralizing operation of said rods and further including dogs on said members biased to engage said rods for effecting gear shifting operation of the latter upon separative movement of said members and means for selectively disengaging said dogs from said rods.

49. In a gear shifting mechanism, the combination with shift rods, of neutralizing and shifting means therefor including a pair of oscillatable members movable towards one another to engage and neutralize said rods and further including a pair of coaxial dogs pivoted to each of said members and biased to engage said rods for movement of the latter out of neutral relation upon separative movement of said members, said dogs having actuating elements arranged in proximity and a rotatable member coacting with said elements for selective disengagement of said dogs from said rods.

50. In a gear shifting mechanism, the combination with shift rods, of neutralizing and shifting means therefor including a pair of oscillatable members movable towards one another to engage and neutralize said rods and further including pair of coaxial dogs pivoted to each of said members and biased to engage said rods for movement of the latter out of neutral relation upon separative movement of said members, said dogs having actuating elements all arranged in proximity and a rotatable notched disk coacting with all of said elements and operable at will to provide for selective disengagement of said dogs from said rods.

51. In a gear shifting mechanism, the combination with shift rods, of neutralizing and shifting means therefor including relatively movable members and dogs on said members to be selectively engaged with said rods and selecting means for said dogs, all of said dogs being normally disengaged from said means.

52. In a gear shifting mechanism, the combination with shift rods, of neutralizing and shifting means therefor including relatively movable members and dogs on said members to be selectively engaged with said rods and selecting means for said dogs, all of said dogs being normally disengaged from said means and being engageable therewith by movement of said members to effect neutralizing operation of said rods.

53. In a gear shifting mechanism, the combination with shift rods, of shifting and neutralizing means therefor including relatively movable members and dogs pivoted on said members to be selectively engaged with said rods and a selector disk for said dogs, the former being arranged in a plane parallel to the plane of pivotal movement of the latter.

54. In a gear shifting mechanism, the combination with shift rods, of shifting and neutralizing means therefor including relatively movable members and dogs on said members to be selectively engaged with said rods, said members being movable in one relation to effect neutralizing operation of said rods and in another relation to effect shifting operations thereof according to the selection of said dogs and a selector disk for said dogs, said disk being disposed in a plane parallel to the plane of movement of said dogs and the former having its center substantially in line with the pivots of the latter.

55. In a gear shifting mechanism, the combination with shift rods, of plates fixed thereto to provide parts engageable by actuating means and also to interlock said rods against relative rotation and neutralizing and shifting means for said rods including movable members engageable with said plates.

56. In a gear shifting mechanism, the combination with shift rods, of plates each secured to one of said rods and having a lug engaging in a longitudinal slot in another rod and a pair of oscillatable arms to receive the lugs of said plates therebetween, said arms being oscillatable towards one another to operate said rods through the medium of said lugs.

57. In a gear shifting mechanism, the combination with shift rods, of plates each secured to one of said rods and having a lug engaging in a longitudinal slot in another rod and a pair of oscillatable arms to receive the lugs of said plates therebetween, said arms being oscillatable towards one another to operate said rods through the medium of said lugs, like elements of said combination being interchangeable.

58. In a gear shifting mechanism, the combination with shift rods each provided with a laterally extending lug engaging in a longitudinal slot in another rod, of neutralizing and shifting means for said rods including a pair of oscillatable members having parts disposed between said rods for engagement with said lugs and parts to be selectively engaged with said rods at other points whereby said rods are operable to a neutral relation by movement of said members towards one another and thereafter shiftable by separative movement of said members.

59. In a gear shifting mechanism, the combination with shift rods, each having a plurality of stops thereon, of operating and neutralizing means for said rods including a pair of oscillatable members mounted to lie in substantially the same plane as that of said rods and each having a forked portion straddling one of said rods and carrying a pair of axially aligned dogs biased into the path of certain stops on said rods whereby said rods are shiftable upon separative movement of said members, said members further having fixed parts projecting into the path of other stops on said rods to provide for neutralization of the latter upon movement of said members towards one another and said dogs having laterally extending spindles carrying crank pins and means co-operable with the crank pins of said dogs to provide for selective withdrawal thereof from operative relation with said rods.

60. In a gear shifting mechanism, the combination with a shift member of an operating member therefor movable in one direction out of a given position to effect shifting operations of said shift member and adapted during return to such position to effect neutralizing operations of said shift member, mechanical connections between said members commutatable to effect different shifting operations of said shift member upon movement of said operating member out of said given position, and commutating means for said connections whereby any connection may be preselected and whereby the preselected connection is established upon neutralizing operation of said operating member.

61. In a gear shifting mechanism the combination with a shift rod, an operating member therefor movable in one direction from a given extreme position to effect shifting operations of said rod and adapted during return to said position to effect neutralizing operations of said rod, a plurality of dogs connected to said member and biased to positions for shifting said rod upon movement of said member out of said given extreme position, and a cam selector member adapted to selectively hold said dogs out of said positions when said operating member is in said given extreme position.

In witness whereof, I have hereunto subscribed my name.

WILLIAM C. STEVENS.